H. GIBBS.
LUBRICATOR.
APPLICATION FILED JAN. 10, 1910.
1,036,216.
Patented Aug. 20, 1912.
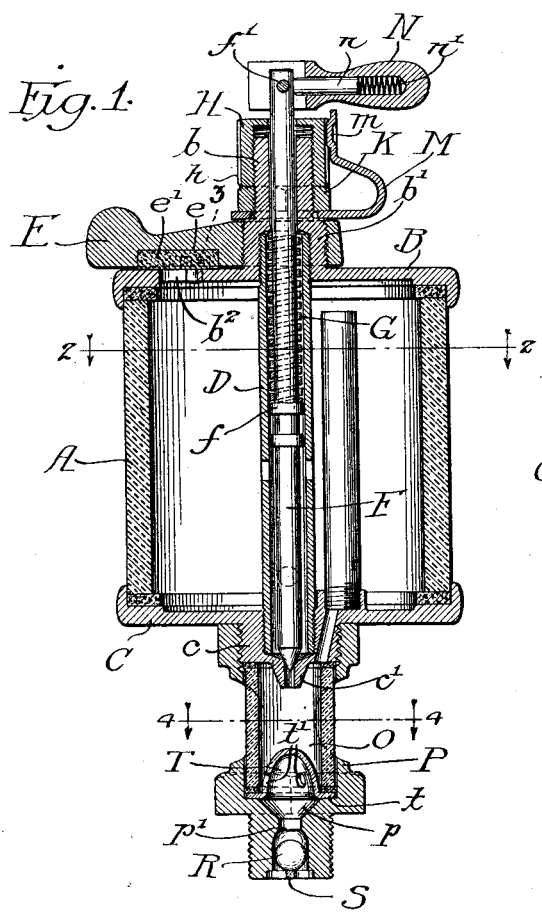
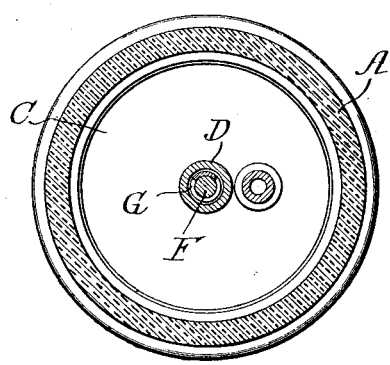
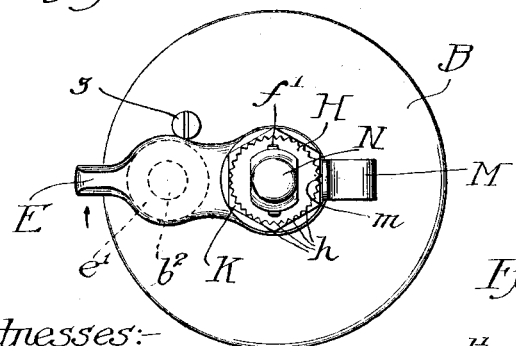
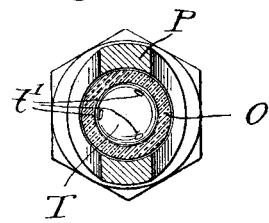
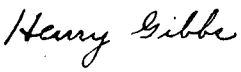
Witnesses:—
Frank W. Bennum
J. C. Freiberg
Inventor:—
Henry Gibbs
By:— Peirce & Fisher
Attys.

UNITED STATES PATENT OFFICE.

HENRY GIBBS, OF CHICAGO, ILLINOIS, ASSIGNOR TO W. D. ALLEN MANUFACTURING COMPANY, OF CHICAGO, ILLINOIS, A CORPORATION.

LUBRICATOR.

1,036,216.  Specification of Letters Patent.  Patented Aug. 20, 1912.

Application filed January 10, 1910.  Serial No. 537,223.

*To all whom it may concern:*

Be it known that I, HENRY GIBBS, a citizen of the United States, and a resident of Chicago, county of Cook, and State of Illinois, have invented certain new and useful Improvements in Lubricators, of which I do declare the following to be a full, clear, and exact description, reference being had to the accompanying drawing, forming part of this specification.

My present invention has relation to that class of gravity feed lubricators, commonly known as "sight-feed" lubricators.

The object of the invention is to improve a lubricator in various respects, as will be hereinafter described, reference being had to the accompanying drawing.

Figure 1 is a view in central vertical section through the lubricator embodying my invention. Fig. 2 is a view in horizontal section on line 2—2 of Fig. 1. Fig. 3 is a top plan view the position of the handle indicating the open position of the outlet valve. Fig. 4 is a view in cross section on line 4—4 of Fig. 1. Fig. 5 is a detail perspective view of the cup shaped back-check plate.

A designates the body of the lubricator that is preferably formed of glass and cylindrical in outline. The body A is clamped between the head B and the base C by means of a central tube D. The tube D is exteriorly screw threaded at its upper and lower ends and the upper end of this tube D sits within a correspondingly threaded opening formed centrally of the head B, while the lower end of the tube D engages a threaded opening in the base C. From the center of the head B and formed integral therewith rises a tubular boss that is formed of the upper and lower threaded portions $b$ and $b'$. The lower threaded portion $b'$, is of somewhat larger diameter than the threaded portion $b$ of the boss, and upon this portion $b'$ is placed a correspondingly screw threaded hub of the swinging scutcheon plate E. The function of the scutcheon plate E is to close a filling hole $b^2$ that is formed in the cap or top plate B; and the scutcheon place E has its under surface formed with a cavity or recess $e$ adapted to receive a leather disk $e'$ which, when the scutcheon plate is in the closed position shown in Fig. 3, will tightly close the filling hole $b^2$. Inasmuch as the scutcheon plate E is mounted upon the threaded lower portion $b'$ of the boss that rises centrally from the top plate B, it will be seen, that when the scutcheon plate is turned in the direction of the arrow, Fig. 3, it will gradually approach the upper surface of the top or cap B and by the time the scutcheon plate contacts with the set screw 3 that rises from the upper surface of the top or cap B, the leather disk upon the under side of the scutcheon plate will bear tightly over the hole $b^2$ and close the same. By forming the scutcheon plate with a recess $e$ in its under side, a very simple and convenient means is provided for retaining the packing disk against danger of accidental displacement, while permitting this disk to be readily removed and replaced when required.

Within the tube D is mounted the valve stem F, the lower end of which is pointed, thereby forming a needle valve that bears against a seat formed at the end of the boss $c$ that depends from and is formed integral with the base C. The lower part of the boss $c$ is shaped to form the perforated nipple $c'$ through which the oil will be delivered into the sight-feed chamber beneath it, in manner well understood in the art.

The valve stem F is formed with a shoulder $f$ against which bears the lower end of a coiled spring G, the upper end of this spring bearing against an inwardly projecting shoulder formed in the boss that rises from the top or cover B. The valve stem F extends completely through the upper portion $b$ of the boss and through a central hole formed in a cup-shaped nut H that is interiorly threaded to engage the upper portion $b$ of the boss. Beneath the nut H is placed a jam nut K, and beneath this jam nut and above the portion $b'$ of the boss is mounted a spring plate M, the upper end of which is bent and is formed with an offset $m$ to engage in the peripheral notches $h$ of the nut H. The spring M thus serves to hold the nut H in any position at which it may be set to determine the extent of opening of the outlet valve and the nut K serves to securely clamp the spring M against the upper portion of the enlarged part $b'$ of the boss.

To the upper end of the valve stem F there is pivotally connected, as at $f'$, a handle N. This handle is chambered, as shown, and carries a plunger $n$ that is forced normally outward by a coiled spring $n'$, the said plunger under the action of spring $n$ serving to hold the handle N in its different positions of adjustment, the end of the plunger engaging either the sides or the top portion of the valve stem F to effect this purpose. The purpose of the handle N is to enable the valve stem F to be lifted and it will be seen that when the handle is swung from the position shown by full lines to the position shown in Fig. 3, in which the handle is vertical, the inner end of the handle N will be brought to bear against the top of the nut H and will lift the valve stem until the valve at its lower end is withdrawn from its seat.

The sight chamber beneath the nipple $c'$ consists of the usual glass cylinder O that is held within a cage P. The upper end of the cage P is interiorly threaded to engage the boss $c$ that depends from the base C, in the usual manner.

When lubricators of the general character described are used in situations in which there is no back pressure from the part being lubricated, it is not necessary or customary to employ any check valve between the sight-feed chamber and the part to be lubricated, but when such lubricators are used in connection with steam or explosive engines, from which there is possibility of back pressure, it is customary to interpose a check valve in the lower part of the lubricator and below the sight-feed chamber.

I have shown my improved lubricator as more particularly designed for use in connection with explosive engines and for this reason the lower portion of the cage P of the sight-feed chamber has its discharge channel $p$ provided with a spherical check valve R, adapted to close upwardly against a seat $p'$ in the discharge passage that leads from the sight-feed chamber, this check valve R being held against displacement by a skeleton plate S that extends across the discharge opening of the sight-feed chamber. In order to prevent oil or gas, which may be forced into the sight feed chamber by back pressure from the engine, directly impinging the walls of said chamber and the discharge nipple, which will tend to disturb the formation of the oil drops at the nipple $c'$ within the sight-feed chamber O, I provide a cup shaped back-check plate T. This back-check plate T is preferably formed from a single plate of metal having a flange $t$ that sits beneath the tubular sight glass and openings $t'$ are formed in the side walls of the back-check plate T to permit the oil to pass therethrough and to direct and distribute any back flow of oil or gas about the lower part of the sight feed chamber and away from the nipple $c'$.

By forming the back-check plate T with the flange $t$ this plate will be effectively held in position without the need of any other means for retaining it in place and without the necessity of remodeling the cage P.

When the lubricator is to be used for lubricating a part from which there can be no back pressure, the back-check plate T and the check valve R can be omitted. It will therefore be seen that the parts of the lubricator can be quickly assembled, either for use in an explosive or steam engine at a point where there is possibility of back pressure, in which event the check valve R and the back-check plate P will be employed, or by omitting the check valve and back-check plate the lubricator can be assembled for use in situations in which there is no danger of back pressure.

Having thus described my invention, what I claim as new and desire to secure by Letters Patent, is:—

1. A lubricator of the character described comprising a reservoir having a base provided with a depending nipple, a sight-feed chamber having a glass body located beneath said nipple and a laterally perforated cup-shaped back-check plate having an annular flange extending beneath the glass of said sight-feed chamber and over the discharge passage in the bottom of said chamber.

2. In combination with a lubricator casing, an apertured sight feed chamber therebeneath, a glass lining wall for said sight feed chamber, and a cap member having a dished center portion rising above the plane of the peripheral edge portion, held in position over the apertured bottom of the sight feed chamber by the engagement of said peripheral portion between the lower edges of said glass lining wall and the bottom of the sight feed chamber, said cap having a perforation in its dished portion located to one side of the central axis thereof and of the sight feed chamber whereby the interior of the sight feed chamber is protected from the direct impingement of lubricating oil explosively forced thereinto from without.

3. As a new article of manufacture, a sight feed lubricator, having, in combination with an apertured bottom transparent side lining walls, and an apertured side wall engaging about said transparent lining walls, a perforated cap member having an upwardly concaved center portion, and plane edge portions adapted to engage between said bottom and the adjacent lower edges of the side lining walls, whereby the cap is held in desired position over the aperture in the bottom with its perforation to one side of the central axis of the chamber and of the cap thereby protecting the interior of the lubricator against the direct impingement of lubricating oil explosively forced thereinto from without.

HENRY GIBBS.

Witnesses:
OTTILIE C. FREIBERG,
CLARA A. NORTON.

---

Copies of this patent may be obtained for five cents each, by addressing the "Commissioner of Patents, Washington, D. C."